[11] 3,572,880

[72] Inventor Thomas J. Negrelli
 Dayton, Ohio
[21] Appl. No. 788,152
[22] Filed Dec. 31, 1968
[45] Patented Mar. 30, 1971
[73] Assignee The National Cash Register Company
 Dayton, Ohio

[54] METHOD OF ELIMINATING A PERTURBATION WHEN FORMING A HOLAGRAPHIC SPATIAL FILTER
 4 Claims, 3 Drawing Figs.
[52] U.S. Cl. ........................................... 350/3.5,
 350/162, 356/71
[51] Int. Cl. ......................................... G02b 27/00,
 G02b 27/38
[50] Field of Search ............................. 350/3.5,
 162 (SF); 340/15.5 (Inquired); 356/71; 250/219;
 235/181

[56] References Cited
UNITED STATES PATENTS
3,414,875 12/1968 Driver et al. ................. 350/162
OTHER REFERENCES
 Vanderlugt, Applied Optics, Vol. 5; No. 11, Nov. 1966, pp. 1760—1765 (copy in 350 N.2 sf)

*Primary Examiner*—David Schonberg
*Assistant Examiner*—Ronald J. Stern
*Attorneys*—Louis A. Kline, John J. Callahan and John P. Tarlano ABSTRACT: The present invention relates to a method of eliminating perturbation between a reference beam and a source beam during the formation of a hologram. A Fraunhofer diffraction pattern of the subject of the hologram is placed in front of a recording medium in which a hologram of the subject is to be formed. Perturbation between the reference beam and the source beam is thus eliminated. A hologram, such as is used in a character recognition system, may be improved by the method of the present invention.

PATENTED MAR 30 1971

3,572,880

INVENTOR
THOMAS J. NEGRELLI

BY Louis A. Kline
John J. Callahan
John P. Tarlano

HIS ATTORNEYS

METHOD OF ELIMINATING A PERTURBATION WHEN FORMING A HOLAGRAPHIC SPATIAL FILTER

BACKGROUND OF THE INVENTION

A. Vander Lugt, in the Institute of Electrical Engineers Transactions on Information Theory, Vol. 2, pp. 139 to 145, Apr. 1964, disclosed the formation of a hologram. He directs a source beam, consisting of a first portion of homogeneous monochromatic light, through a transparent character which is in an opaque film, which has a transmittance $T_o(x,y)$. The source beam continues through a transformation lens, which produces a Fourier transform, $t_o(x,y)$, of the source beam $T_o(xy)$. The source beam finally stops at a photographic plate at the focus of the transformation lens. Vander Lugt directs a reference beam, consisting of a second portion of homogeneous monochromatic light, through a focusing lens, which focuses a spot of light $T_s(x,y)$ in the plane of the opaque film. The reference beam continues through the transformation lens, which produces a Fourier transform $t_s(x,y)$ of said reference beam $T_s(x,y)$. The reference beam interferes with the source beam at the photographic plate. There is a perturbation between the reference beam and the source beam. The photographic plate is chemically processed, and forms a hologram of said transparent character.

The hologram may be used in a character detection system which will detect the presence of the transparent character, when the transparent character is illuminated with homogeneous monochromatic light, and the light is passed, successively, through the transformation lens, through the hologram, and through an imaging lens, and a spot of light $T_s(x,y)T_o(x,y)T_o^*(x,y)$ is produced.

In the method of the present invention, a Fraunhofer diffraction pattern of a transparent character on an opaque background is inserted in front of the hologram to prevent perturbation between the source beam and the reference beam. The Fraunhofer diffraction pattern is inserted in the path of homogeneous monochromatic light made by eliminating the focusing lens from the optical arrangement described above. A Fraunhofer diffraction pattern, instead of a hologram, is then formed on a photographic plate. Such a Fraunhofer diffraction pattern is a spatially variable light filter. When the Fraunhofer diffraction pattern is used in front of a photographic plate, during the formation of a hologram, it produces a new type of hologram.

Such a hologram will reconstruct a spot of light $T_s(x,y)$, rather than a perturbed spot of light $T_o(x,y)T_o^*(x,y)T_s(x,y)$ when used in a character detection system. Due to the removal of the factor $T_o(x,y)T_o^*(x,y)$ from $T_s(x,y)$, the spot of light reconstructed by this new type of hologram is sharper, and the spot of light may, therefore, be more easily detected. The method of the present invention allows one to increase the detectibility of a character recognition system.

SUMMARY OF THE INVENTION

The present invention relates to a method of forming a hologram on a first recording medium, of recorded information in the form of a transparent configuration recorded on a second recording medium, comprising positioning said second recording medium between a source of homogeneous monochromatic light and a Fourier transformation lens at the focal plane of said Fourier transformation lens; allowing light from said source of homogeneous monochromatic light to pass through said transparent configuration recorded on said second recording medium to form a Fraunhofer diffraction pattern of said transparent configuration thereon; positioning a focusing lens between said source of homogeneous monochromatic light and said second recording medium, said focusing lens being operable to focus a portion of light from said source of homogeneous monochromatic light into a spot of light in the plane of said second recording medium; allowing a portion of light from said source of homogeneous monochromatic light to pass successively through said transparent configuration recorded on said second recording medium, said Fourier transformation lens, and said third recording medium, onto said first recording medium; and allowing another portion of light from said source of homogeneous monochromatic light to pass successively through said focusing lens, said Fourier transformation lens, and said third recording medium, onto said first recording medium.

DESCRIPTION OF THE PREFERRED EMBODIMENT

Figure 1:
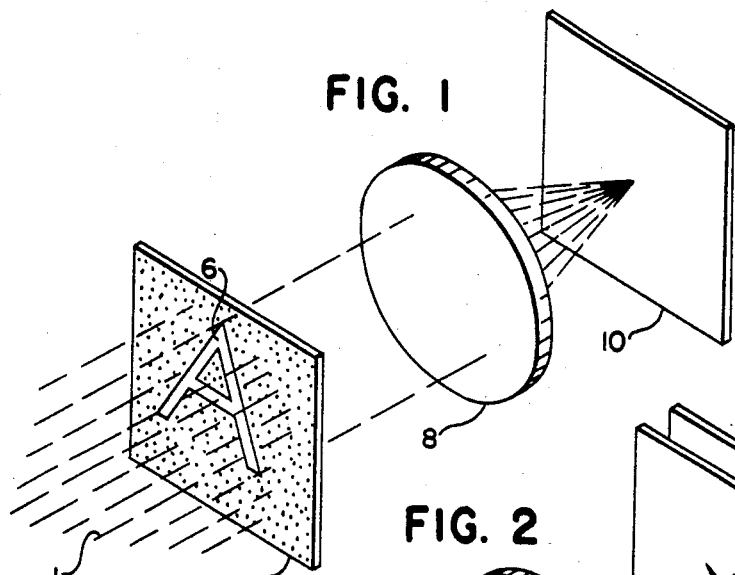
FIG. 1 is a plan view of the forming of a Fraunhofer diffraction pattern of a transparent character, on an opaque background, on a photographic plate.
Figure 2:
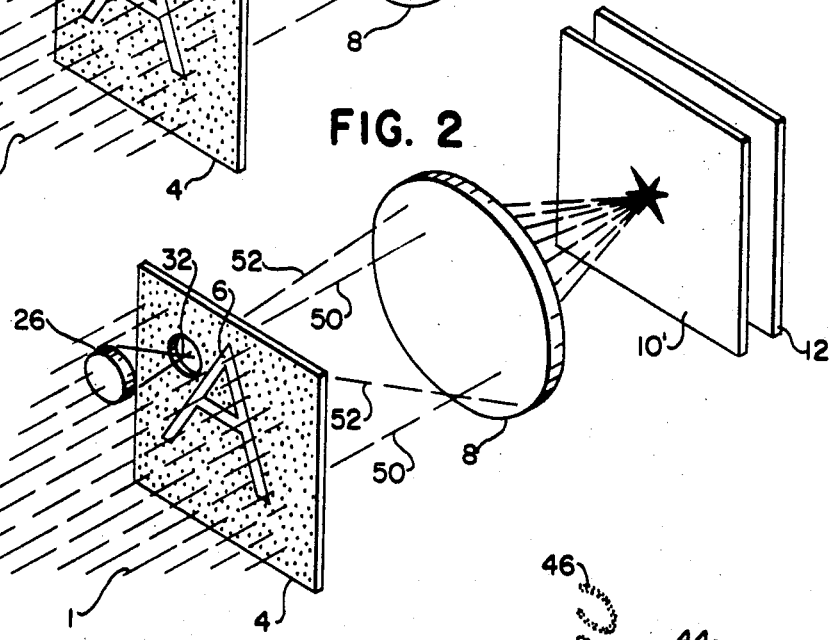
FIG. 2 is a plan view of the forming of the hologram of the present invention by incorporating a Fraunhofer diffraction pattern of said transparent character on an opaque background.

As shown in FIG. 1, a Fraunhofer diffraction pattern of a transparent character is formed on a photographic plate 10. Homogeneous monochromatic light 1, as from a laser, is directed through a transparent configuration 6, such as a transparent character, on an opaque recording medium 4, such as on a photographic plate. The photographic plate has therein a transmittance $T_o(x,y)$. The homogeneous monochromatic light 1 continues through a transformation lens 8 and onto a recording medium 10, such as a photographic plate or a photochromic plate. Said recording medium 10 is photographically processed to form a Fraunhofer diffraction pattern 10' thereon, as shown in FIG. 2. The Fraunhofer diffraction pattern 10' has an intensity transmittance of $$\frac{1}{|t_o(x, y)|^2}, t_o(x, y)$$

being the Fourier transform of the transmittance $T_o(x,y)$ of the transparent character 6 within the opaque film 4. The Fraunhofer diffraction pattern 10' is the result of diffraction of the coherent monochromatic light 1 at the edges of the transparent character 6.

As shown in FIG. 2, a recording medium 12, such as a photographic plate, is placed behind said developed Fraunhofer diffraction pattern 10', said Fraunhofer diffraction pattern having a transmittance of $$\frac{1}{|t_o(x, y)|^2}$$

Figure 3:
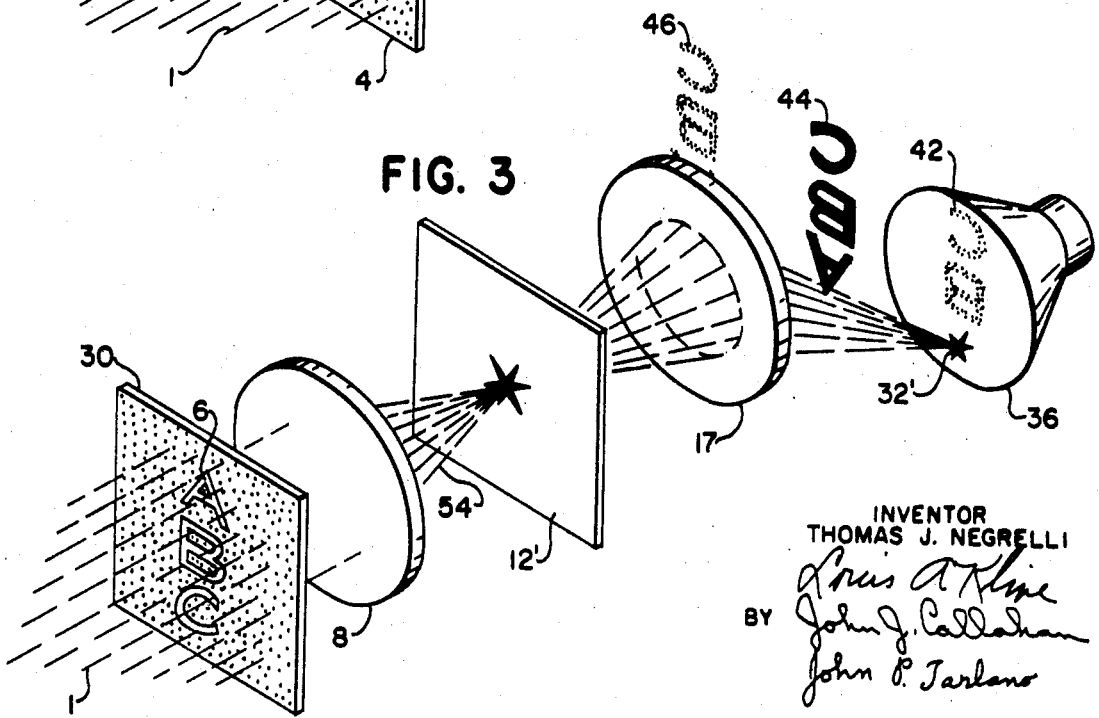
FIG. 3 is a plan view of the detecting of one of said transparent characters, on an opaque background, by means of a character detection system.

Homogeneous monochromatic light 1 is a split into a source beam 50, and a reference beam 52, by a focusing lens 26. The source beam 50 is directed through said opaque film 4, which has a transmittance $T_o(x,y)$, and through said Fourier transformation lens 8. Said lens 8 produces a Fourier transformation $t_o(x,y)$ of the source beam 50. The source beam 50 proceeds through the Fraunhofer diffraction pattern 10', having an intensity transmittance $$\frac{1}{|t_o(x, y)|^2}$$

and onto said photographic plate 12. The reference beam 52 is focused by the lens 26 as a spot of light $T_s(x,y)$, 32, in the plane of said opaque film 4. The reference beam 52 diverges onto the lens 8. The reference beam 52 passes through the transformation lens 8, which lens 8 produces a Fourier transformation $t_s(x,yl)$, also, of said spot of light $T_s(x,y)$, 32. Said reference beam 52 then proceeds through said Fraunhofer diffraction pattern 10' and cross-correlates with the source beam 50 at said photographic plate 12. Said photographic plate 12 is chemically processed to form a hologram 12', as shown in FIG. 3. The transmittance of the hologram 12' is $$\frac{t_o(x,y)^2 t_o^*(x,y)}{|t_o(x,y)|^2} + \frac{t_o(x,y) t_s(x,y) t_s^*(x,y)}{|t_o(x,y)|^2}$$

$$+ \frac{t_o^2(x,y) t_s^*(x,y)}{|t_o(x,y)|^2} \exp + \frac{t_o(x,y) t_o^*(x,y) t_s(x,y)}{|t_o(x,y)|^2} \exp$$

The Fraunhofer diffraction pattern 10' produces the factor $$\frac{1}{|t_o(x, y)|^2}$$

in each term of the transmittance of the hologram 12'.

As shown in FIG. 3, said Fraunhofer diffraction pattern 10' has been removed from its position behind said Fourier transformation lens 8. An imaging lens 17 and a vidicon tube 36 are positioned behind said hologram 12'.

A recording medium 30, such as an opaque film, having many transparent characters, including the transparent character 6, thereon, is illuminated by homogeneous monochromatic light 1. A portion of said homogeneous monochromatic light proceeds onward through said Fourier transformation lens 8 and through said hologram 12'. The light 54 is cross-correlated by the hologram 12' into $$\frac{t(x, y)^2 t^*(x, y)}{|t_o(x, y)|^2} + \frac{t_o(x, y)t_s(x, y)t_s^*(x, y)}{|t_o(x, y)|^2}$$

$$+ \frac{t_o^2(x, y)t_s^*(x, y)}{|t_o(x, y)|^2} \exp + \frac{t_o(x, y)t_o^*(x, y)t_s(x, y)}{|t_o(x, y)|^2} \exp$$

The imaging lens 17 images said light 54 as a spot of light $T_s(x, y)$, 32', on a section of said vidicon tube 36. The spot of light 32' is a part of a sideband of light produced by the diffraction of the light 54 by the hologram 12'. Except for the spot of light 32' replacing the transparent character 6, the sideband 42 is an inverted image of the characters on the recording medium 30. A sideband 46 and a central image 44 are also produced by the diffraction of tee light 54 by the hologram 12'. The spot of light $T_s(x,y)$, 32', is unperturbed by the factor $T_o(x,y)T_o^*(x,y)$, due to the $$\frac{1}{|t_o(x, y)|^2}$$

factor introduced into the hologram 12' by said Fraunhofer diffraction pattern 10'. The sideband 42 is mathematically expressed by the fourth term of the expression above, while the central order 44 is expressed by the first two terms, and the sideband 46 by the third term, of the expression. The spot of light 32' is therefore sharper and more easily detected by said vidicon tube 36.

I claim:

1. A method of forming a hologram on a first recording medium, of recorded information in the form of a transparent configuration recorded on a second recording medium, comprising:
   positioning said second recording medium between a source of homogeneous monochromatic light and a Fourier transformation lens at the front focal plane of said Fourier transformation lens;
   allowing light from said source of homogeneous monochromatic light to pass through said transparent configuration recorded on said second recording medium and onto a third recording medium in the rear focal plane of said Fourier transformation lens to form a Fraunhofer diffraction pattern of said transparent configuration thereon;
   developing said third recording medium;
   positioning a focusing lens between said source of homogeneous monochromatic light and said second recording medium;
   said focusing lens being operable to focus a portion of light from said source of homogeneous monochromatic light into a spot of light in the plane of said second recording medium;
   allowing a portion of light from said source of homogeneous monochromatic light to pass successively through said transparent configuration recorded on said second recording medium, said Fourier transformation lens, and the developed third recording medium, onto said first recording medium, the first and third recording media being located in the rear focal plane of said Fourier transformation lens; and
   allowing another portion of light from said source of homogeneous monochromatic light to pass successively through said focusing lens, said Fourier transformation lens, the developed third recording medium onto said first recording medium.

2. A method of forming a hologram, on a first recording medium, of recorded information in the form of a transparent configuration recorded on a second recording medium, comprising:
   positioning a third recording medium, comprising a Fraunhofer diffraction pattern of said transparent configuration recorded on said second recording medium, between a Fourier transformation lens and said first recording medium, the first and third recording media being located in the rear focal plane of said Fourier transformation lens;
   positioning said second recording medium between a source of homogeneous monochromatic light and said Fourier transformation lens at the front focal plane of said Fourier transformation lens;
   positioning a focusing lens between said source of homogeneous monochromatic light and said second recording medium;
   said focusing lens being operable to focus a portion of light from said source of homogeneous monochromatic light into a spot of light in the plane of said second recording medium;
   allowing a portion of light from said source of homogeneous monochromatic light to pass successively through said transparent configuration recorded on said second recording medium, said Fourier transformation lens, and said third recording medium onto said first recording medium; and
   allowing another portion of light from said source of homogeneous monochromatic light to pass successively through said focusing lens, said Fourier transformation lens, and said third recording medium onto said first recording medium.

3. A method of determining the presence and position of selected information, in the form of a transparent configuration recorded on a first recording medium, with respect to other similar information recorded thereon, comprising:
   positioning a second recording medium, containing said selected information, between a source of homogeneous monochromatic light and a Fourier transformation lens at the front focal plane of said Fourier transformation lens;
   allowing light from said source of homogeneous monochromatic light to pass through said transparent configuration corresponding to said selected information recorded on said second recording medium and onto a third recording medium in the rear focal plane of said Fourier transformation lens to form a Fraunhofer diffraction pattern of said transparent configuration thereon;
   developing said third recording medium;
   positioning a focusing lens between said source of homogeneous monochromatic light and said second recording medium;
   said focusing lens being operable to focus a portion of light from said source of homogeneous monochromatic light into a spot of light in the plane of said second recording medium;
   allowing a portion of light from said source of homogeneous monochromatic light to pass successively through said transparent configuration recorded on said second recording medium, said Fourier transformation lens, and the developed third recording medium onto a fourth recording medium, the fourth and third recording media being located in the rear focal plane of said Fourier transformation lens;
   allowing another portion of light from said source of homogeneous monochromatic light to pass successively through said focusing lens, said Fourier transformation lens, and the developed third recording medium onto said fourth recording medium, said fourth recording medium thereby being a hologram;
   positioning said first recording medium, so as to replace said second recording medium, between said source of homogeneous monochromatic light and said Fourier transformation lens; and allowing light from said source of homogeneous monochromatic light to pass successively through said first recording medium, said Fourier transformation lens, said fourth recording medium, and an imaging lens onto a light detector means whereby the presence and position of said selected information are determined.

4. A method of determining the presence and position of selected information, in the form of a transparent configuration recorded on a first recording medium, with respect to other similar information recorded thereon, comprising:

positioning a second recording medium, containing said selected information, between a source of homogeneous monochromatic light and a Fourier transformation lens at the front focal plane of said Fourier transformation lens;

positioning a focusing lens between said source of homogeneous monochromatic light and said second recording medium, said focusing lens being operable to focus a portion of light from said source of homogeneous monochromatic light into a spot of light in the plane of said second recording medium;

positioning a third recording medium, comprising a Fraunhofer diffraction pattern corresponding to said selected information recorded on said second recording medium, between said Fourier transformation lens and a fourth recording medium, the fourth and third recording media being located in the rear focal plane of said Fourier transformation lens;

allowing a portion of light from said source of homogeneous monochromatic light to pass successively through said transparent configuration recorded on said second recording medium, said Fourier transformation lens, and said third recording medium onto a fourth recording medium;

allowing another portion of light from said source of homogeneous monochromatic light to pass successively through said focusing lens, said Fourier transformation lens, and said third recording, onto said fourth recording medium, said fourth recording medium thereby being a hologram;

positioning said first recording medium so as to replace said second recording medium, between said source of homogeneous monochromatic light and said Fourier transformation lens; and allowing light from said source of homogeneous monochromatic light to pass successively through said first recording medium, said Fourier transformation lens, said fourth recording medium, and an imaging lens onto a light detector means whereby the presence and position of said selected information are determined.

UNITED STATES PATENT OFFICE
CERTIFICATE OF CORRECTION

Patent No. 3,572,880           Dated March 30, 1971

Inventor(s) Thomas J. Negrelli

It is certified that error appears in the above-identified patent and that said Letters Patent are hereby corrected as shown below:

On the cover sheet [54] "METHOD OF ELIMINATING A PERTURBATION WHEN FORMING A HOLAGRAPHIC SPATIAL FILTER" should read -- METHOD OF ELIMINATING A PERTURBATION WHEN FORMING A HOLOGRAPHIC SPATIAL FILTER --. Column 1, line 2, "HOLAGRAPHIC should read -- HOLOGRAPHIC --. Column 2, line 67, "$t_s(x,y1)$" should read -- $t_s(x,y)$ --; lines 73 to 77, the equation should appear as shown below:

$$\frac{t_o(x,y)t_o^*(x,y)}{|t_o(x,y)|^2} + \frac{t_s(x,y)t_s^*(x,y)}{|t_o(x,y)|^2} + \frac{t_o(x,y)t_s^*(x,y)}{|t_o(x,y)|^2}\exp + \frac{t_o(x,y)^*t_s(x,y)}{|t_o(x,y)|^2}$$

Column 3, lines 17 to 19, the portion of the equation should appear as shown below:

$$\frac{t_o(x,y)^2 t_o^*(x,y)}{|t_o(x,y)|^2} + \frac{t_o(x,y)t_s(x,y)t_s^*(x,y)}{|t_o(x,y)|^2}$$

Signed and sealed this 7th day of September 1971.

(SEAL)
Attest:

EDWARD M. FLETCHER, JR.
Attesting Officer

ROBERT GOTTSCHLAK
Acting Commissioner of Pat